(12) United States Patent
Taira et al.

(10) Patent No.: US 7,453,637 B2
(45) Date of Patent: Nov. 18, 2008

(54) PROJECTION TYPE SCREEN AND IMAGE PROJECTION SYSTEM

(75) Inventors: Kazuki Taira, Tokyo (JP); Yuzo Hirayama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 447 days.

(21) Appl. No.: 11/362,201

(22) Filed: Feb. 27, 2006

(65) Prior Publication Data

US 2006/0215260 A1 Sep. 28, 2006

(30) Foreign Application Priority Data

Mar. 22, 2005 (JP) ............................ P2005-081984

(51) Int. Cl.
*G03B 21/60* (2006.01)
(52) U.S. Cl. ...................................... 359/455; 359/459
(58) Field of Classification Search ......... 359/454–455, 359/459, 463
See application file for complete search history.

(56) References Cited

U.S. PATENT DOCUMENTS 3,712,708 A * 1/1973 Brown ........................ 359/459
3,782,805 A * 1/1974 Brown ........................ 359/459
4,732,441 A * 3/1988 Cheng ........................ 359/451
5,210,641 A * 5/1993 Lewis ........................ 359/448

FOREIGN PATENT DOCUMENTS

JP 06-265818 9/1994
JP 09-189884 7/1997

OTHER PUBLICATIONS

H. Kaneko, Desktop Autostereoscopic Display Using Compact LED Projectors and CDR Screen, SID 02 Digest (2002) pp. 1418-1421., May 2002.

* cited by examiner

*Primary Examiner*—Christopher Mahoney
(74) *Attorney, Agent, or Firm*—Finnegan, Henderson, Farabow, Garrett & Dunner, L.L.P.

(57) ABSTRACT

A projection type screen comprises a reflection surface array and a lenticular sheet. In the reflection surface array, a plurality of reflection surfaces is located along a horizontal direction. Each reflection surface has a mirror reflectivity of which section along the horizontal direction is quadratic curve shape. The lenticular sheet is located at an incident side of a projection light for the reflection surface array. The lenticular sheet has diffusivity along a vertical direction.

20 Claims, 17 Drawing Sheets

PROJECTION TYPE SCREEN AND IMAGE PROJECTION SYSTEM

CROSS-REFERENCE TO RELATED APPLICATIONS

This application is based upon and claims the benefit of priority from prior Japanese Patent Application No. 2005-81984, filed on Mar. 22, 2005; the entire contents of which are incorporated herein by reference.

FIELD OF THE INVENTION

The present invention relates to a projection type screen and image projection system for a user to perform autostereoscopy.

BACKGROUND OF THE INVENTION

A stereoscopic image display apparatus capable of autostereoscopy is as an apparatus for displaying a stereoscopic image, for example, without a special device such as a polarized glass or a glass with shutter.

For example, in Japanese Patent No. 3323575 (pp 3, FIG. 1) . . . (reference 1), a plurality of images, each having a different view position, are respectively projected by a plurality of projectors from the back of a transmission type screen. By observing the transmission light through a lenticular lens located in front of the screen, a user can observe a stereoscopic image.

Furthermore, in Japanese Patent Disclosure (Kokai) PH9-0189884 (pp 4, FIG. 1) . . . (reference 2), on a projection type screen in which a plurality of rotatable reflection mirrors are arraged along a horizontal direction, a plurality of images each having different view position are projected by switching in time. In this case, the user can also observe a stereoscopic image.

Furthermore, in "H. Kaneko, T. Ohshima, O. Ebina and A. Arimoto, "Desktop Autostereoscopic Display Using Compact LED Projectors and CDR Screen", SID 02 DIGEST, pp. 1418-1421, 2002". . . (reference 3), a plurality of projectors projects an image onto a projection type screen having shape of corner reflection mirror. By observing the reflection light at a position of the projector, the user can also observe the stereoscopic image.

In order to widely use the stereoscopic display apparatus, the observable area of a stereoscopic image should be wide, and a scale of apparatus necessary to display the stereoscopic image should not be large. Especially, a small number of projectors necessary to display the stereoscopic image is important to prevent the scale of apparatus from being large. Without special function, it is desired that the stereoscopic image is displayed by one projector.

However, in the stereoscopic image display apparatus of the references 1 and 3, a plurality of projectors is necessary. Especially, in order to simultaneously observe a stereoscopic image from a plurality of view positions by extending an observable area, the number of projectors has to be increased. In this case, a scale of the apparatus becomes large.

Furthermore, in the stereoscopic image display apparatus of the reference 2, in synchronization with a projection image timely switched by a projector, rotation of reflection mirrors set on a screen has to be controlled. Accordingly, in the projector outgoing the image, a controller to synchronize rotation of the projection image with the reflection mirrors is necessary. In case of using this method, a usual projector cannot display the stereoscopic image.

SUMMARY OF THE INVENTION

The present invention is directed to a projection type screen and image projection system for a user able to observe by autostereoscopy using a usual projector.

According to an aspect of the present invention, there is provided a projection type screen comprising: a reflection surface array in which a plurality of reflection surfaces are located along a horizontal direction, each reflection surface having a mirror reflectivity of which section along the horizontal direction is quadratic curve shape; and a lenticular sheet located at an incident side of a projection light for the reflection surface array, the lenticular sheet having diffusivity along a vertical direction.

According to another aspect of the present invention, there is also provided an image projection system comprising: a light emitting apparatus emitting a projection light including a display image; and a projection type screen on which the projection light is incident; wherein said projection type screen comprises a reflection surface array in which a plurality of reflection surfaces are located along a horizontal direction, each reflection surface having a mirror reflectivity of which section along the horizontal direction is quadratic curve shape; and a lenticular sheet located at an incident side of a projection light for the reflection surface array, the lenticular sheet having diffusivity along a vertical direction.

DETAILED DESCRIPTION OF THE EMBODIMENTS

Figure 1:
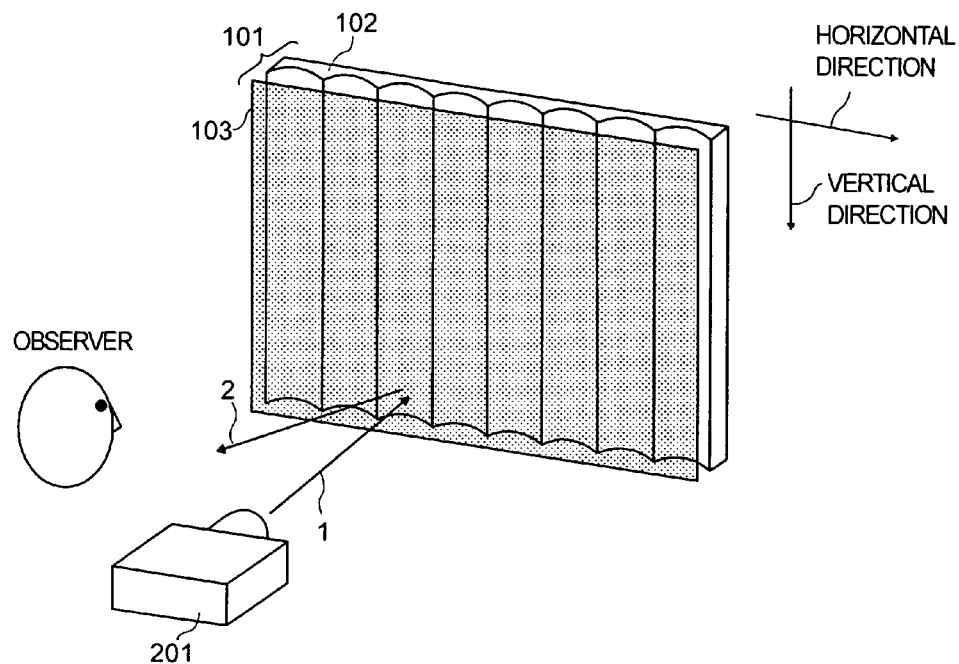
FIG. 1 shows components of an image projection system including a projection type screen according to a first embodiment of the present invention.

Hereinafter, various embodiments of the present invention will be explained by referring to the drawings. The present invention is not limited to the following embodiments.

The First Embodiment

FIG. 1 is a block diagram of an image projection system having a projection type screen according to a first embodiment of the present invention. The projection type screen 101 comprises a reflection surface array 102 and a lenticular sheet 103. In the reflection surface array 102, a plurality of reflection surfaces each having mirror reflectivity is located along a horizontal direction. The lenticular sheet 103 has diffusivity along a vertical direction.

Furthermore, a projection light 1 is outgoing from a projector 201 as a light emitting apparatus to the projection type screen 101. An observer views a reflection light 2 of the projection light 1. In FIG. 1, the number of reflection surfaces in the reflection surface array 102 is eight. Actually, several hundred reflection surfaces may be used based on the display resolution of a stereoscopic image. As the projector 201, for example, a DLP (Digital Light Processing) projector using DMD (Digital micro Mirror Device) and a liquid crystal projector using a liquid crystal display device are used. Furthermore, an optical modulation device using a diffraction grating, for example, a projector of laser scanning type, can be used.

Figures 2A, 2B:
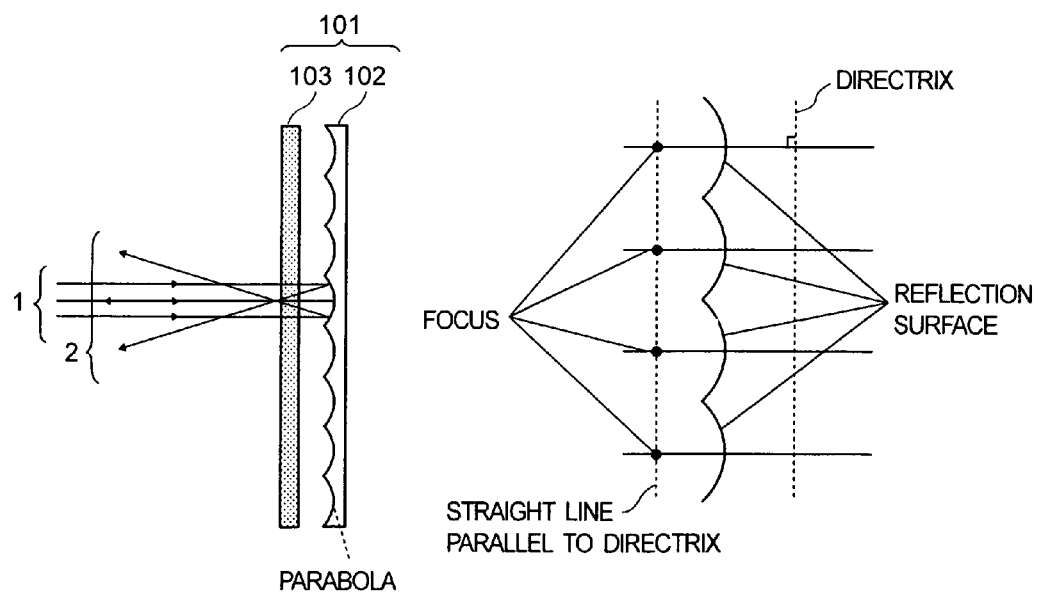
FIGS. 2A and 2B are sectional views of the projection type screen along a horizontal direction according to the first embodiment.
Figure 3:
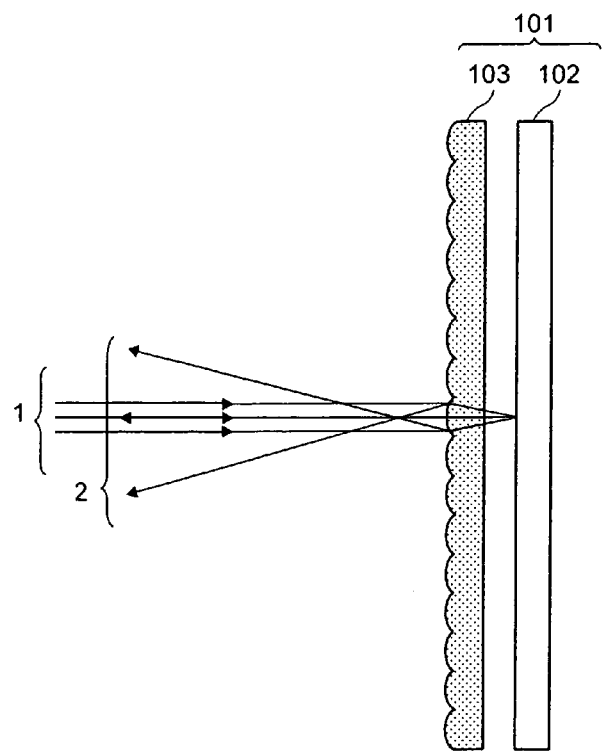
FIG. 3 is a sectional view of the projection type screen along a vertical direction according to the first embodiment.

FIGS. 2 and 3 are respectively sections along a horizontal direction and a vertical direction of the projection type screen according to the first embodiment.

As shown in FIG. 2A, a section of each reflection surface of the reflection surface array 102 along a horizontal direction is a concave quadratic curve facing an incident direction of the projection light 1. In this case, the quadratic curve has a parabolic shape. As shown in FIG. 2B, a directrix of a parabola of each reflection surface coincides, and a focus point of the parabola of each reflection surface exists on the same straight line parallel to the directrix.

On the other hand, as shown in FIG. 3, a section of the lenticular sheet 103 along a vertical direction is convex to the incident light 1. Accordingly, the lenticular sheet 103 diffuses the incident light 1 along a vertical direction. In this case, diffusion degree of the reflection light 2 is determined by a lens parameter such as a focus distance calculated by a lens shape of the lenticular sheet 103. The lenticular sheet 103 diffuses the reflection light 2 reflected by the reflection surface array 102 along a vertical direction. Accordingly, an incident position of the projection light 1 on the lenticular sheet 103 may not be strictly determined.

Figure 4:
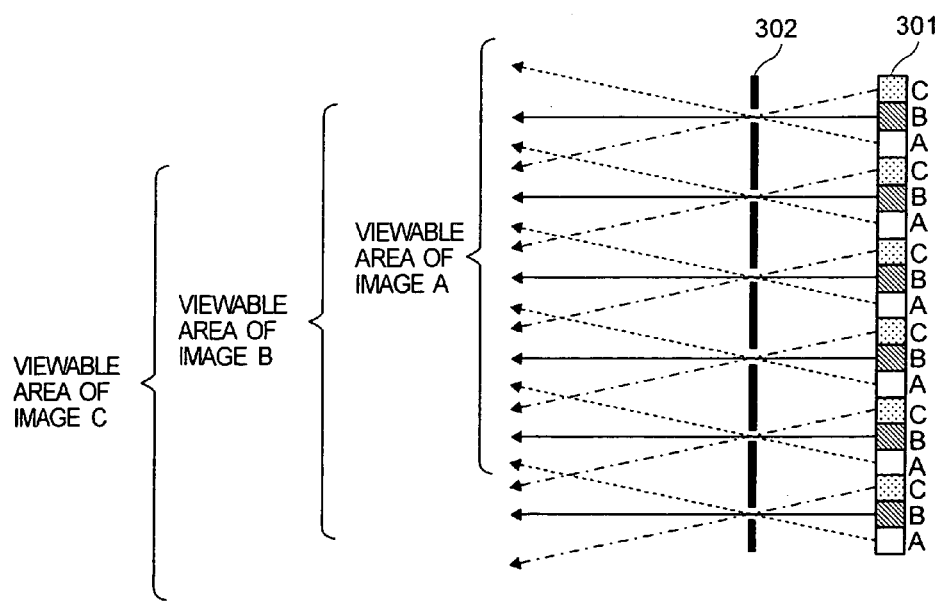
FIG. 4 is a schematic diagram showing function of a stereoscopic display apparatus of direct view type.
Figure 5:
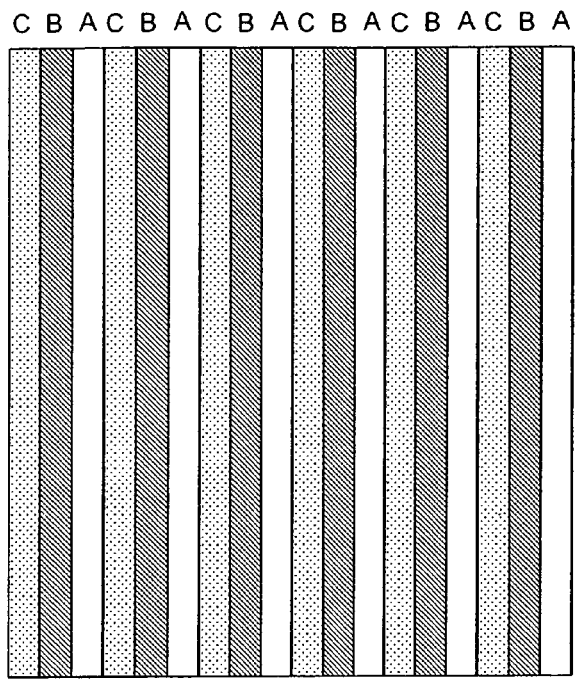
FIG. 5 shows one example of a display image of the stereoscopic display apparatus of direct view type.

Next, a principle to display a stereoscopic image by the projection type screen 101 is explained. First, a principle of autostereoscopy in a stereoscopic image display apparatus of direct view type is explained. FIG. 4 shows a section along a horizontal direction in the stereoscopic image display apparatus to observe three images (A, B and C) from different eye positions. In the stereoscopic image display apparatus of FIG. 4, as shown in FIG. 5, images A, B and C are divided as a strip shape along a vertical direction and are display-arranged in order. A barrier 302 as a slit is located in front of a display 301. As shown in FIG. 4, by setting the barrier 302 in front of the display 301, each image can be observed from a predetermined direction. By adjusting a pitch to display each image on the display 301 and a space of slit of the barrier 302, a direction from which each image is observable is set as angle narrower than both eyes of the observer. In this case, the observer can view the stereoscopic image. For example, in FIG. 4, if an image A and an image B are a stereo image, autostereoscopy is realized by simultaneously observing the image A and the image B.

Figure 6:
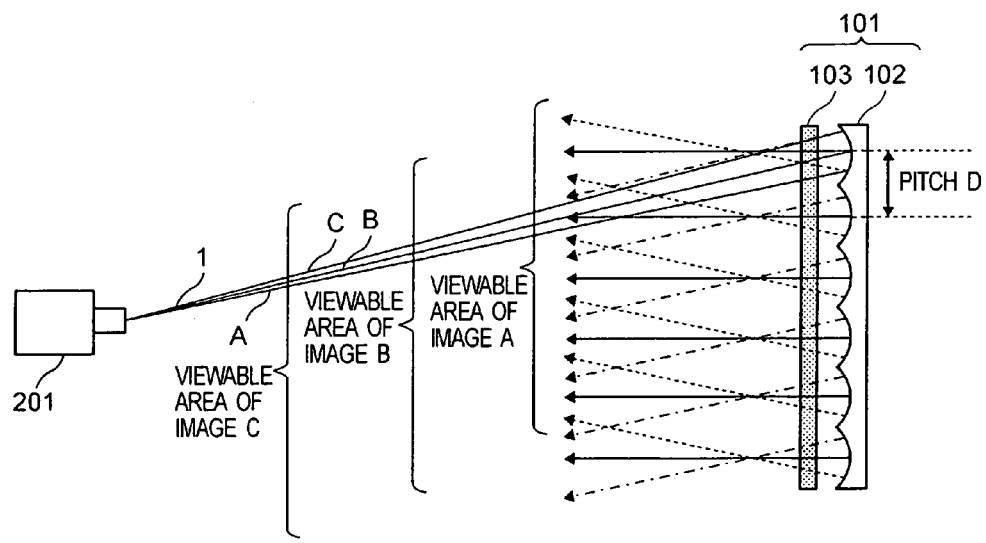
FIG. 6 is a schematic diagram of function of the projection type screen according to the first embodiment.

FIG. 6 is a schematic diagram to explain function of the projection type screen of the first embodiment using the principle of autostereoscopy. First, projection light 1 is outgoing from the projector 201 to the projection type screen 101. The projection light 1 includes three kinds of images A, B and C. Each image is divided as a strip shape along a vertical direction and arranged in order as shown in FIG. 5.

Figure 7:
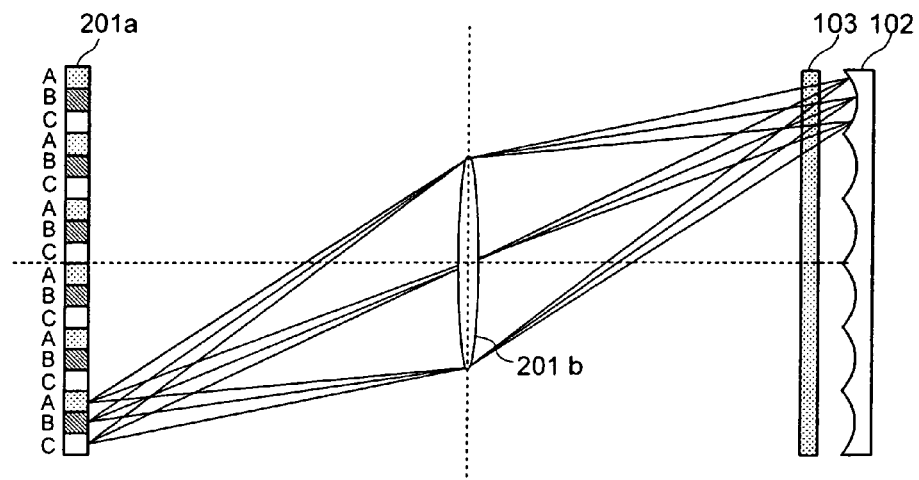
FIG. 7 is a schematic diagram showing a relationship between a projection light and a reflection surface array of the projection type screen according to the first embodiment.

In order for an usual projector to obtain such image, as shown in FIG. 7, each image is divided as a strip shape along a vertical direction, and displayed by arranging in order on an image display device 201a of the projector 201. These images are projected with magnification through a projection lens 201b of the projector 201. In this case, an image outgoing from the projector 201 and projected on the projection type screen 101 is a reverse image of the image displayed on the image display device 201a of the projector 201. Accordingly, in order to display a normal image at the incident timing, the reverse image has to be displayed on the image display device 201a.

Figure 8:
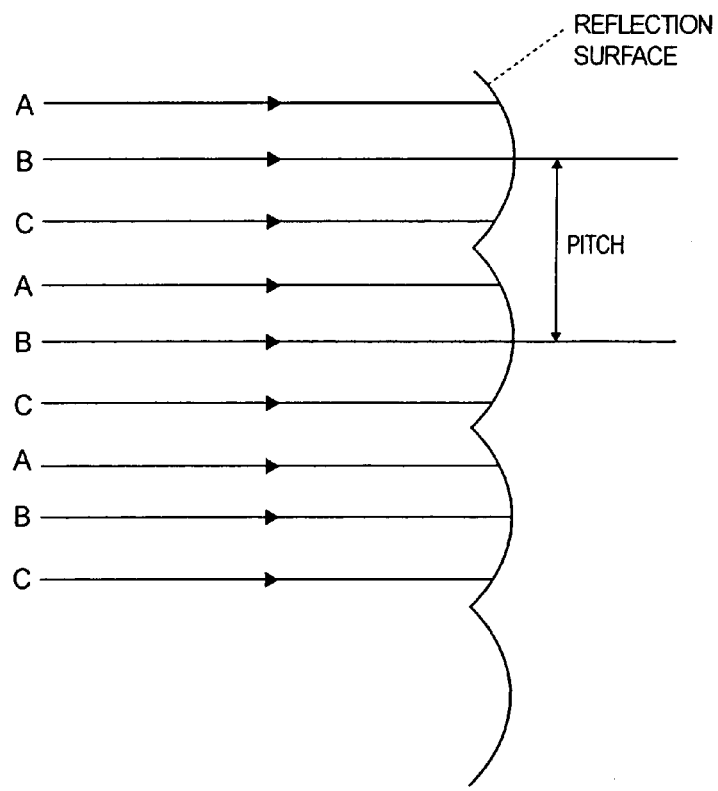
FIG. 8 is a schematic diagram showing a relationship between a projection light and a pitch of the reflection surface array in the projection type screen according to the first embodiment.

The projection light 1 outgoing from the projector 201 is incident onto each reflection surface of the reflection surface array 102. In this case, each reflection surface of the reflection surface array 102 has a concave parabolic shape facing an incident direction of the projection light 1. Accordingly, a direction of the reflection light is different by the incident position of the projection light 1. If the projector 201 is sufficiently far from the projection screen 101, the projection light 1 is incident as a parallel light onto the projection type screen 101. Accordingly, as shown in FIG. 8, a pitch between neighboring reflection surfaces on the reflection surface array 102 and a pitch of incident position of each image included in the projection light 1 on the reflection surface has to be arranged. In this case, a reflection direction of each image in the incident light 1 can be arranged on the reflection surface array 102, and each image can be observed from respective predetermined direction. In the same way as the stereoscopic image display apparatus of FIG. 4, by setting an observable direction of each image at an angle narrower than a space between the eyes of an observer, the observer can view the stereoscopic image.

Figure 9A:
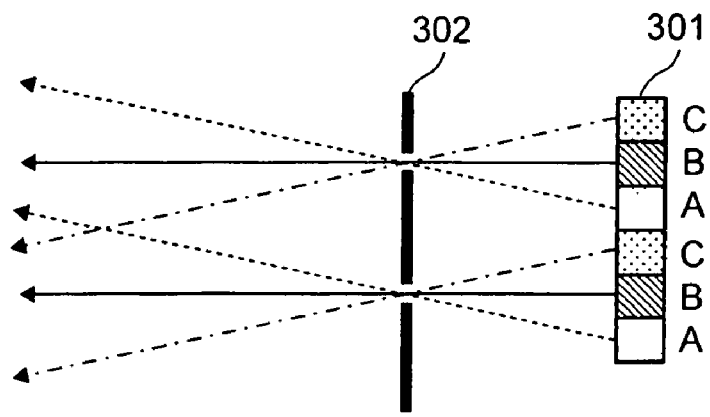
FIGS. 9A and 9B are schematic diagrams showing a relationship between the projection type screen and the stereoscopic display apparatus of direct view type according to the first embodiment.
Figure 9B:
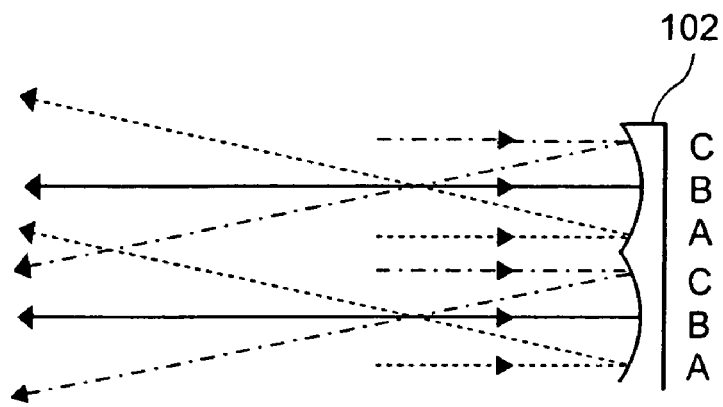

FIGS. 9A and 9B are schematic diagrams showing the relationship between the stereoscopic image display apparatus in FIG. 4 and the projection type screen of the first embodiment. Concretely, in the stereoscopic image display apparatus of FIG. 9A, by covering a display 301 with a barrier 302 having slits, each image (A, B, C) on the display 301 can be observed from a predetermined direction. On the other hand, in the projection type screen 101 of FIG. 9B, each reflection surface has a parabolic shape, and incident projection light 1 is reflected along different directions according to the incident position on the reflection surface 102. Accordingly, by arranging a pitch of each reflection surface and a pitch of each image in the projection light 1, each image (A, B, C) can be observed from a respective predetermined direction.

Next, as for each reflection surface of the reflection surface 102 of the projection type screen 101, relationship between a focus distance g of the reflection surface and a pitch D between neighboring reflection surfaces is explained.

Figure 10:
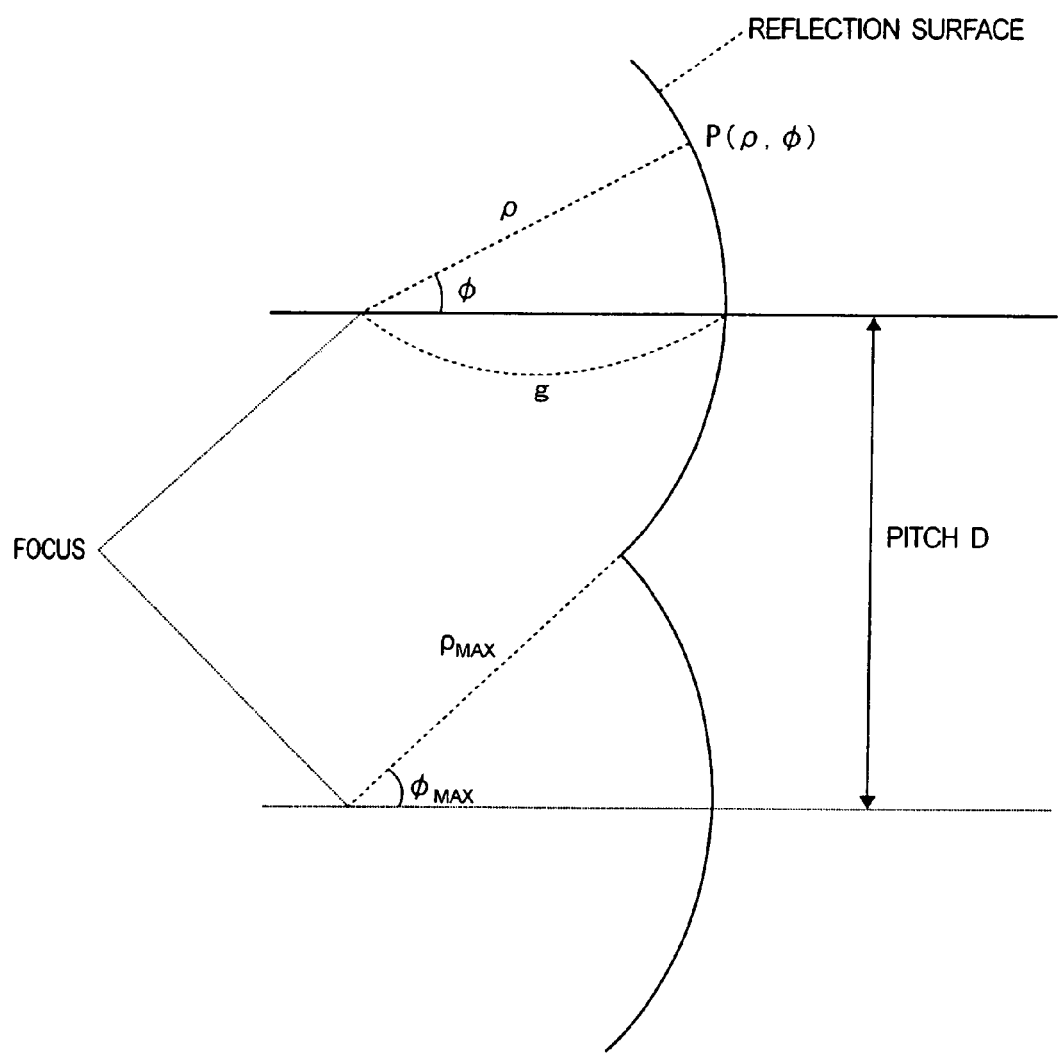
FIG. 10 is a schematic diagram showing a relationship between a pitch and a focus distance of the projection type screen according to the first embodiment.

As shown in FIG. 10, a coordinate of a point P on a reflection surface is represented by polar coordinates $(\rho, \phi)$ centering a focus point of the reflection surface. In this case, $\rho$ represents a distance from the focus point to the point P on the reflection surface, and $\phi$ represents an angle between a straight line passing through the focus point and perpendicular to the directrix and a straight line passing through the focus point and the point P. The relationship between the focus distance g and the point P on the reflection surface is represented as following equation (1).

$$\rho = \frac{2g}{1+\cos\phi} \quad (1)$$

In this case, the maximum outgoing angle ($\phi$ in case that P is on the edge of the reflection surface) of reflection light is $\phi_{MAX}$, and $\rho$ for the maximum outgoing angle $\phi_{MAX}$ is $\rho_{MAX}$. The pitch D between reflection surfaces of the reflection surface array 102 is represented as following equation (2).

$$D = \frac{4g \cdot \sin\phi_{MAX}}{1+\cos\phi_{MAX}} \quad (2)$$

The maximum outgoing angle $\phi_{MAX}$ of reflection light is a parameter to regulate observable area of stereoscopic image. If the observable area is previously set as $\phi_{MAX}$, a pitch D of neighboring reflection surfaces of the reflection surface array 102 is calculated from a focus distance g of reflection surface using the equation (2). By arranging a plurality of reflection surfaces based on the pitch D, the reflection array 102 of the projection type screen 101 can be obtained.

As mentioned-above, in the projection type screen, a plurality of images in the projection light from the projector are respectively reflected along different directions by the reflection surface array in which section of each reflection surface along a horizontal direction has a parabolic shape. In this case, by arranging a pitch between neighboring reflection surfaces and a pitch of each divided image in the projection light, each image can be observed from respective predetermined direction Furthermore, by setting observable direction of each image at an angle narrower than a space between the eyes of an observer, the observer can view a stereoscopic image. Furthermore, in the image projection system including the projection type screen of the first embodiment, a projector to obtain the projection light is only one usual projector. Accordingly, scale of the system is miniaturized.

Figure 11:
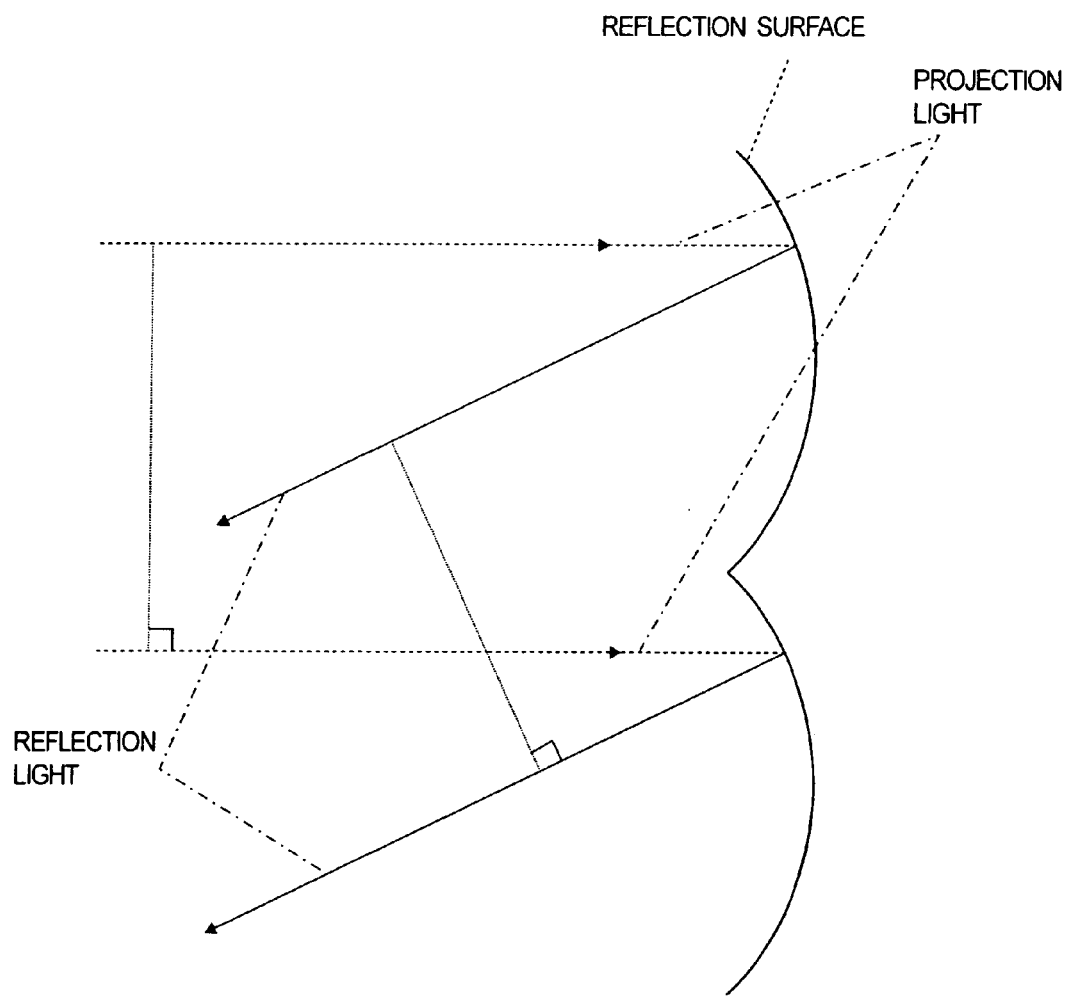
FIG. 11 shows reflection light of a parallel light incident onto the projection type screen according to the first embodiment.

In the first embodiment, a section of each reflection surface along a horizontal direction has a parabolic shape concave facing incident direction of projection light. A directrix of the parabola of each reflection surface coincides, and the focus point of each parabolic reflection surface exists on the same straight line parallel to the directrix. If the projector 201 is sufficiently distant from the projection type screen 101, projection light 1 incident to the projection type screen 101 is almost parallel. Accordingly, if a pitch of neighboring reflection surfaces on the reflection surface array 102 is equal to a pitch of divided images included in the projection light 1, as shown in FIG. 11, images reflected by each reflection surface are parallel.

Figure 12:
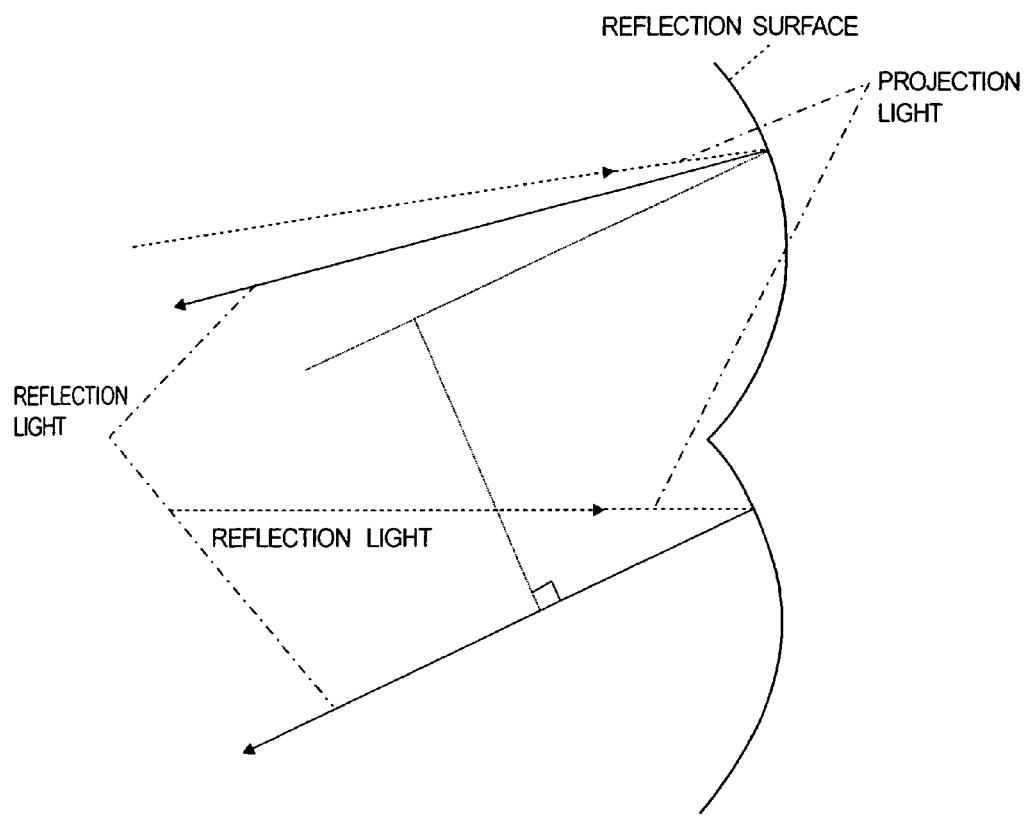
FIG. 12 shows reflection light of a diffusive light incident onto the projection type screen according to the first embodiment.

However, if a distance between the projector 201 and the projection type screen 101 is short, projection light 1 incident to the projection type screen 101 is not parallel. In this case, as shown in FIG. 12, projection light incident to the edge of the projection type screen 101 is reflected along a direction toward the outside from the screen.

Figure 13:
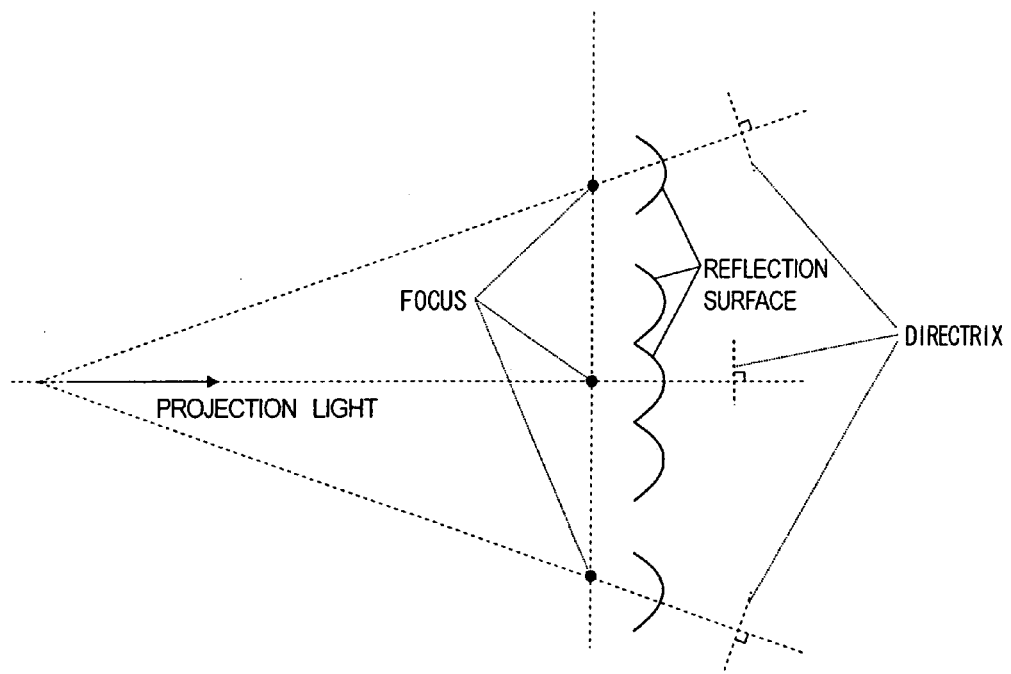
FIG. 13 shows first modification example of the projection type screen according to the first embodiment.

Accordingly, as shown in FIG. 13, a reflection surface of the reflection surface array 102 is formed having a parabolic shape concave toward the projection light 1 so that each straight line perpendicular to a directrix of each parabola and passing through a focus of the parabola crosses at the same point in front of the screen and each focus exists on the same straight line. In this case, a projection light incident near the edge of the reflection surface is prevented from being reflected toward the outside of the reflection surface. Furthermore, a position of an exit pupil of a projection lens of the projector is located at a cross point of straight lines each perpendicular to the directrix of a parabola and passing through a focus point of the parabola. In this case, light reflected by each reflection surface directs toward the projector, and an observer neighboring the projector can effectively recognize a stereoscopic image. As a projection light 1 including an image, the image may not be equally divided and arranged as shown in FIG. 5. In proportion to the angle of reflection of light from each reflection surface, the image may be divided at a wider interval of division toward the edge of the image.

Figure 14:
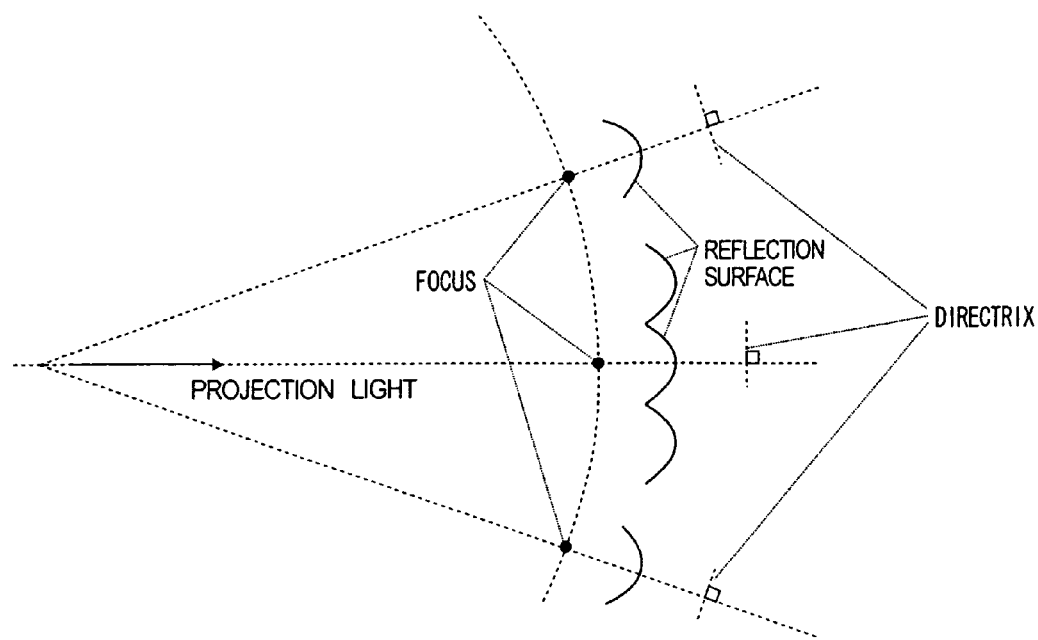
FIG. 14 shows second modification example of the projection type screen according to the first embodiment.

Furthermore, as shown in FIG. 14, the reflection surface array may be formed so that each straight line perpendicular to a directrix of a parabola of each reflection surface and passing through a focus point of the parabola crosses at the same point in front of the screen and the focus points of each parabola exist on an arc of a circle centered at the same point. In this case, a position of an exit pupil of a projection lens is located at a cross point of straight lines each perpendicular to a directrix of a parabola and passing through a focus of the parabola. Accordingly, a distance from the position of the exit pupil of the projection lens to each reflection surface coincides, and position relationship between the exit pupil and the focus of each reflection surface can be fixed.

Figure 15:
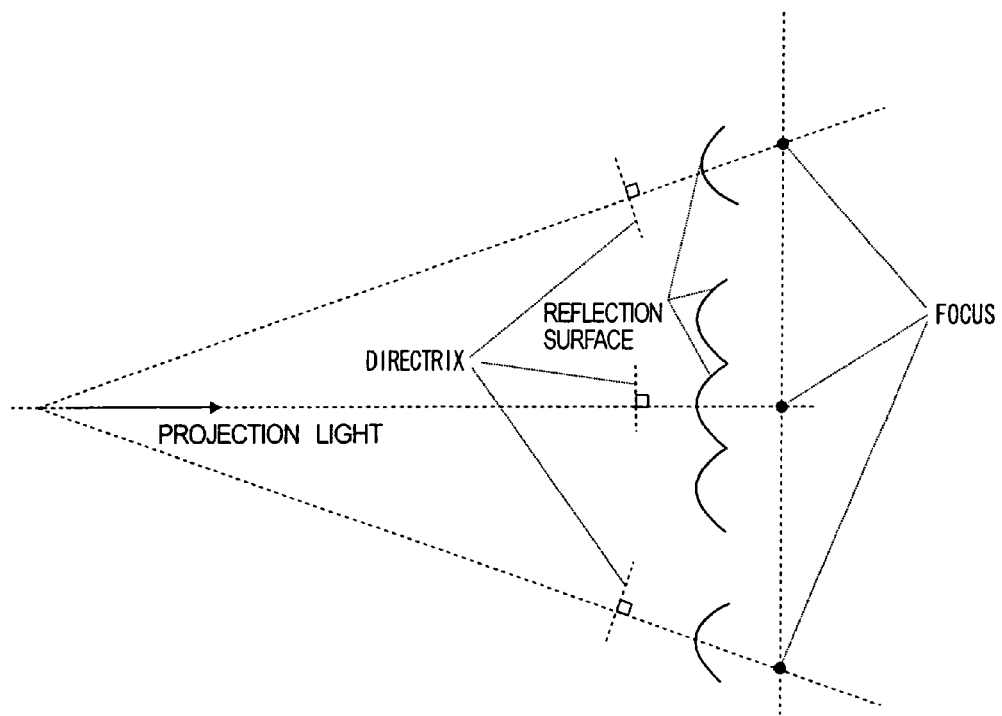
FIG. 15 shows third modification example of the projection type screen according to the first embodiment.

Furthermore, as shown in FIG. 15, a reflection surface array in which a section of each reflection surface along a horizontal direction has a parabolic shape convex to an incident direction of the projection light can be used. In this case, each reflection surface is formed so that each straight line perpendicular to a directrix of each parabola and passing through a focus point of the parabola crosses at the same point in front of the screen and each focus point exists on the same straight line. In this way, even if each reflection surface of the reflection surface array is convex to the incident direction of the projection light, by adjusting a projection position of the projection light on each reflection surface, each image included in the projection light can be viewed from a predetermined direction.

Figure 16A:
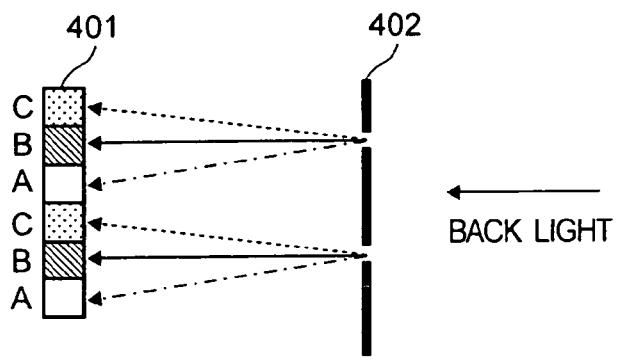
FIGS. 16A and 16B are schematic diagrams showing a relationship between the modification of the projection type screen and the stereoscopic display apparatus of direct view type according to the first embodiment.
Figure 16B:
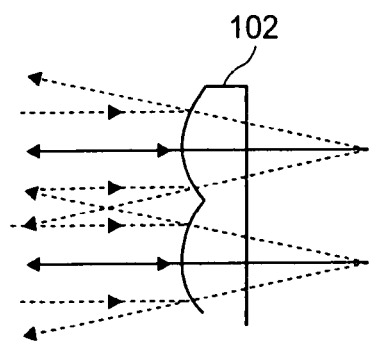

As mentioned-above, in the reflection surface 102, a section of each reflection surface along a horizontal direction is convex to the incident direction of the projection light. On the other hand, in a stereoscopic image display apparatus of direct view type, autostereoscopy is possible by observing a light outgoing from behind a barrier having a slot through pixels located in front of the barrier. FIGS. 16A and 16B show a relationship between the stereoscopic image display apparatus of direct view type and the reflection surface array 102 of the first embodiment. In the stereoscopic image display apparatus of direct view type of FIG. 16A, a light is outgoing by backlight from behind pixels 401 (opposite side of the observer) through a barrier 402 having a slit. The light transmitted through the slit of the barrier 402 is modulated by the pixels 401 and transformed as a display image in which each image (A, B, C) has a directivity along a predetermined direction. Accordingly, the observer positioned in front of the pixels 401 can view each image (A, B, C) from the predetermined direction.

On the other hand, in the reflection array 102 of the projection type screen 101, as shown in FIG. 16B, an incident light to the reflection surface array 102 as parallel light is reflected along different direction based on the incident position. Accordingly, in the same way as the concave section of the reflection surface, by coinciding a pitch of each reflection surface with a pitch of divided images included in the projection light, each image (A,B,C) can be observed from respective predetermined direction.

Figure 17:
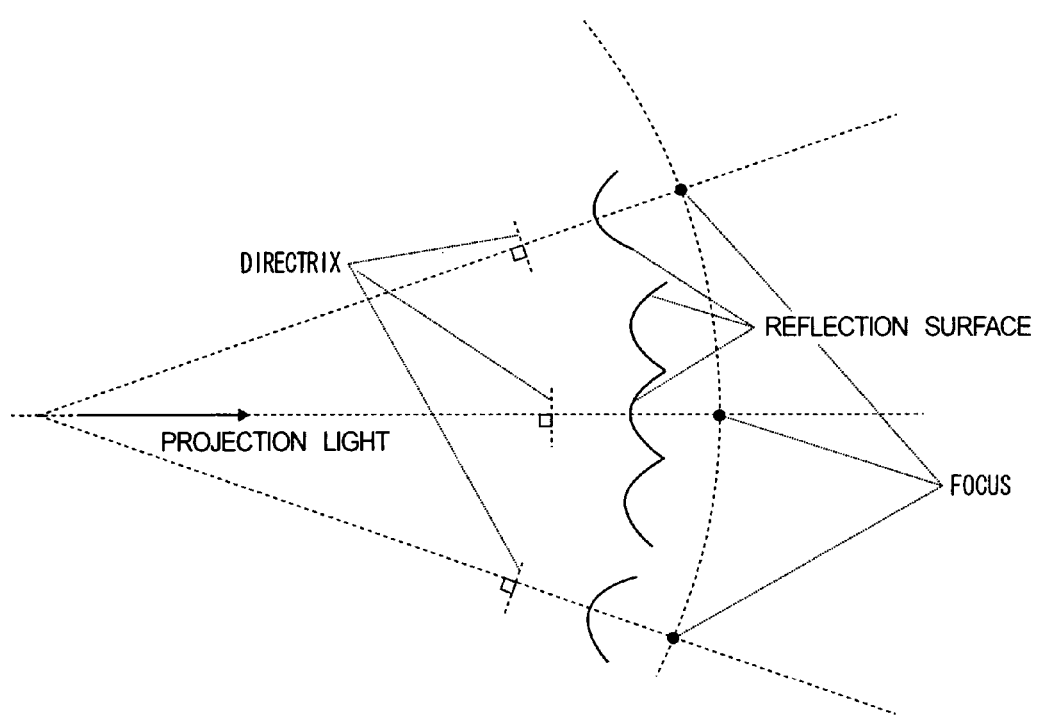
FIG. 17 shows a fourth modification example of the projection type screen according to the first embodiment.

Furthermore, in case that a shape of each reflection surface is a parabolic shape convex to the incident direction of projection light, as shown in FIG. 17, the reflection surface array can be formed so that each straight line perpendicular to a directrix of a parabola of each reflection surface and passing through a focus of the parabola crosses at the same point in front of the screen and a focus of each parabola exists on a circle centered at the same point. In this case, a position of an exit pupil of a projection lens is located at a cross point of straight lines each perpendicular to a directrix of a parabola and passing through a focus of the parabola. Accordingly, a distance from the position of the exit pupil of the projection lens to each reflection surface coincides, and the position relationship between the exit pupil and the focus of each reflection surface can be fixed.

The Second Embodiment

In the first embodiment, a section of each reflection surface of the reflection surface array along a horizontal direction has a parabolic shape. However, in the second embodiment, a section of each reflection surface of the reflection surface array along a horizontal direction has an elliptic shape.

Figure 18A:
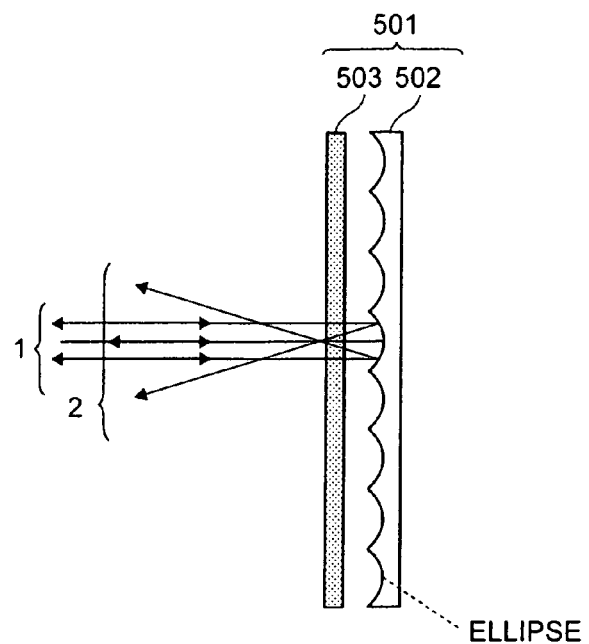
FIGS. 18A and 18B show components of a projection type screen according to a second embodiment of the present invention.
Figure 18B:
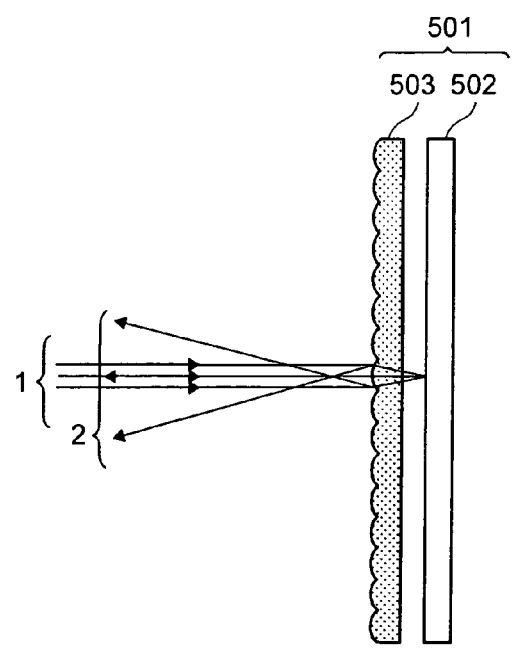

FIGS. 18A and 18B respectively show a section of the projection type screen 501 along a horizontal direction and a vertical direction according to the second embodiment. As shown in FIG. 18A, a section of each reflection surface of the reflection surface array 502 has an ellipse shape concave to an incident direction of the projection light 1. A lenticular sheet 503 is the same component as the projection type screen 101 of the first embodiment. Accordingly, explanation of the lenticular sheet 503 is omitted.

Figure 19:
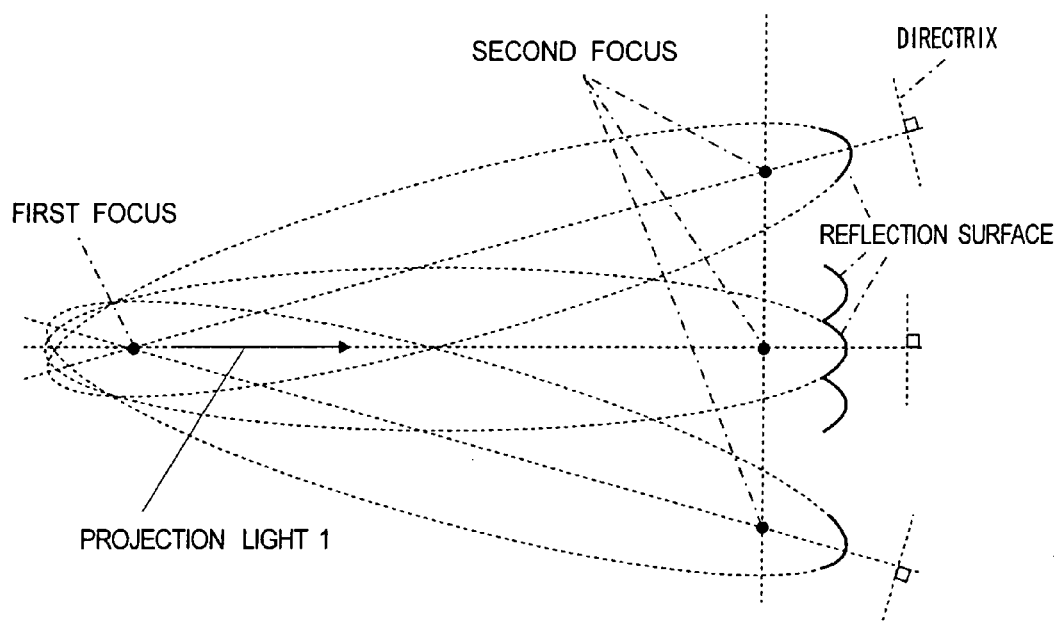
FIG. 19 is a schematic diagram showing a relationship among each reflection surface of the projection type screen according to the second embodiment.

FIG. 19 is a schematic diagram showing the relationship among each reflection surface of the reflection surface array 502 of the projection type screen 501 according to the second embodiment. As shown in FIG. 19, each reflection surface has an elliptic shape concave to an incident direction of the projection light 1. An elliptic shape of each reflection surface is formed so that a straight line perpendicular to a directrix of each ellipse and passing through a focus of the ellipse crosses a first focus distant from the reflection surface of the ellipse and a second focus near the reflection surface of the ellipse. Briefly, the first focus and the second focus exist on the same straight line.

In this way, even if each reflection surface of the reflection surface array 502 is an elliptic shape, a plurality of images included in the projection light 1 are respectively reflected along different direction based on an incident direction of the projection light 1 to each reflection surface. Accordingly, in the same way as the first embodiment, by coinciding a pitch between neighboring reflection surfaces of the reflection surface array 502 with a pitch of divided images included in the projection light 1, each image can be observed from a respective predetermined direction. Furthermore, by setting a direction from which each image is observable at an angle narrower than a space between the eyes of an observer, the observer can view a stereoscopic image.

Next, as for each reflection surface of the reflection array 502 of the projection type screen 501, the relationship among a focus distance L (projection distance) between the reflection surface and the first focus point, a focus distance g between the reflection surface and the second focus point, and a pitch D between neighboring reflection surfaces is explained. Hereinafter, assume that a projection distance L is sufficiently large, and the projection distance L is equal to the focus distance g.

Figure 20:
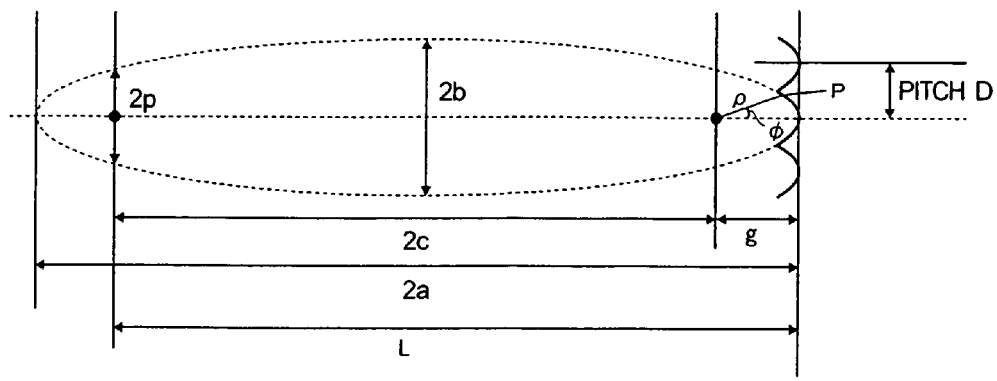
FIG. 20 is a schematic diagram showing a relationship among a pitch, a projection distance, and a focus distance of the projection type screen according to the second embodiment.

As shown in FIG. 20, a coordinate of a point P on a reflection surface is represented by polar-coordinate $(\rho, \phi)$ centered at the second focus point of the reflection surface. In this case, $\rho$ represents a distance between the second focus point and the point P, and $\phi$ represents an angle between a straight line perpendicular to a directrix and passing through the second focus, and a straight line passing through the second focus and the point P. The relation among the focus distance g, the projection distance L, and a distance $\rho$ between the point P and the second focus, is represented as following equation (3).

$$L = 2c + g \qquad (3)$$

$$\rho = \frac{p}{1 + e \cdot \cos\phi}$$

In this case, c represents a distance between a center of ellipse and each focus. Furthermore, p and e respectively represent a focus parameter (½ of chord parallel to short axis and passing through the focus) and an eccentricity of the ellipse. A long radius and a short radius of the ellipse are respectively a and b. The focus parameter and the eccentricity are represented as following equation (4).

$$L = \frac{b^2}{a} \quad (4)$$

$$e = \frac{c}{a} = \sqrt{\frac{a^2 - b^2}{a}}$$

In this case, a maximum outgoing angle ($\phi$ in case that P is on the edge of the reflection surface) of a reflection light is $\phi_{MAX}$, and $\rho$ for the maximum going angle is $\rho_{MAX}$. A pitch D between neighboring reflection surfaces of the reflection surface array 502 is represented as following equation (5).

$$D = \frac{4gL}{g \cdot (1 - \cos\phi_{MAX}) + L \cdot (1 + \cos\phi_{MAX})}. \quad (5)$$

The maximum outgoing angle $\phi_{MAX}$ of the reflection light is a parameter to describe observable area of a stereoscopic image. If the observable area is previously set as $\phi_{MAX}$, the pitch D between neighboring reflection surfaces of the reflection surface array 502 is calculated using the equation (5).

As mentioned-above, a shape of each reflection surface is fixed, and a projector is located so that an exit pupil of the projector is positioned at the first focus in FIG. 19. In this case, a reflection light from each reflection surface is directed toward the projector. Accordingly, an observer neighboring the projector can effectively recognize a stereoscopic image.

In this way, in the projection type screen of the second embodiment, even if a section of each reflection surface of the reflection array along a horizontal direction is an elliptic shape, the stereoscopic image can be observed.

Figure 21:
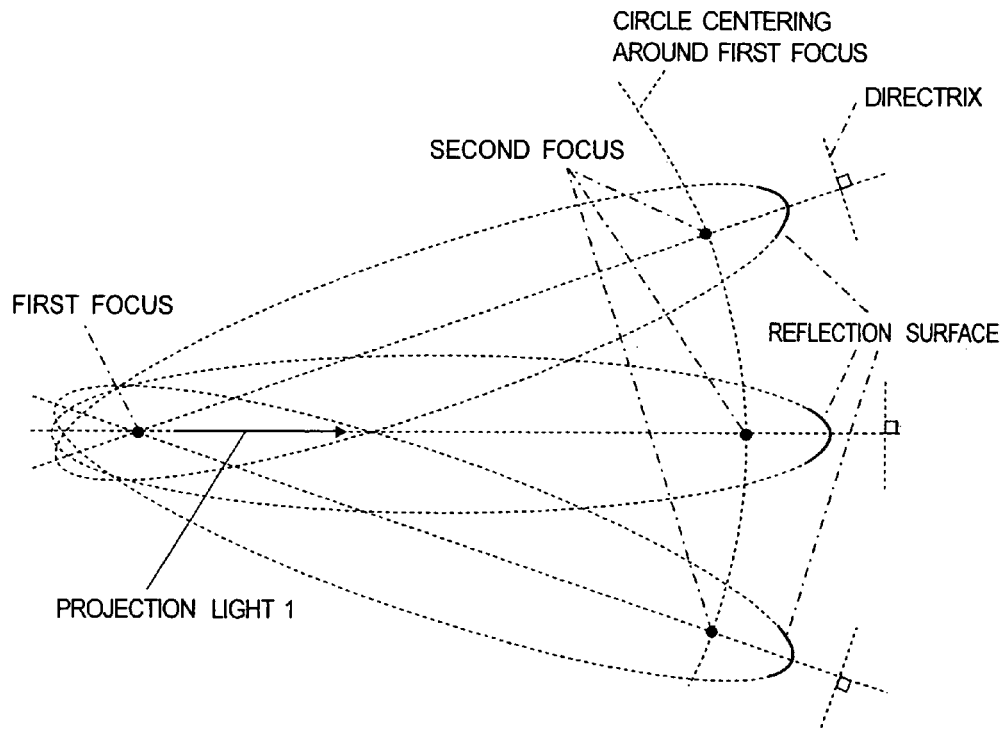
FIG. 21 is a schematic diagram of a first modification of the projection type screen according to the second embodiment.

In the second embodiment, as for an ellipse of each reflection surface of the reflection surface array 502, the second focus points near the reflection surface exist on the same straight line. However, as shown in FIG. 21, the second focus point may exist on the same circle centering the first focus. In this case, the reflection surface array 502 has the same shape of reflection surface at the center and the edge of a screen, and a projection distance from the projector to each reflection surface can coincide. Accordingly, by locating an exit pupil of the projector at the first position in FIG. 21, the positional relationship between the exit pupil and the focus point of each reflection surface can be fixed.

Figure 22:
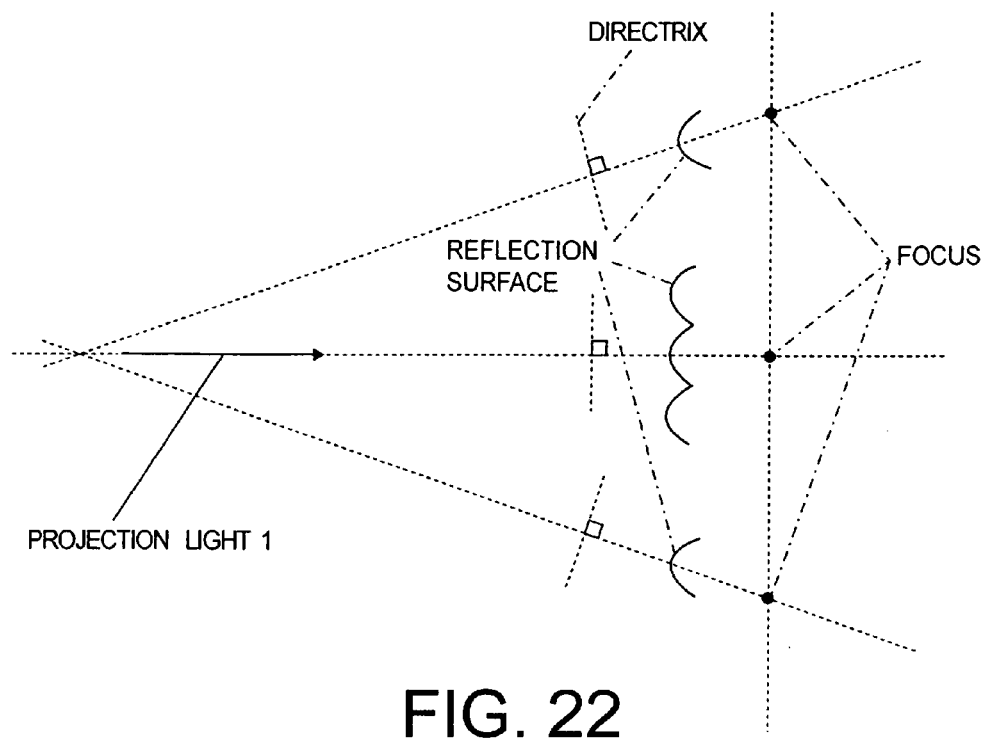
FIG. 22 is a schematic diagram of a second modification of the projection type screen according to the second embodiment.

Furthermore, as shown in FIG. 22, a reflection surface array in which a section of each reflection surface along a horizontal direction is an elliptic shape convex to an incident direction of the projection light can be used. In this case, each reflection surface is formed so that each straight line perpendicular to a directrix of each ellipse and passing through a focus point of the ellipse crosses at the same point in front of the screen and each focus point exists on the same straight line. In this way, even if each reflection surface of the reflection surface array is a convex to the incident direction of the projection light, by adjusting a projection position of the projection light on each reflection surface, each image included in the projection light can be viewed from a predetermined direction.

Figure 23:
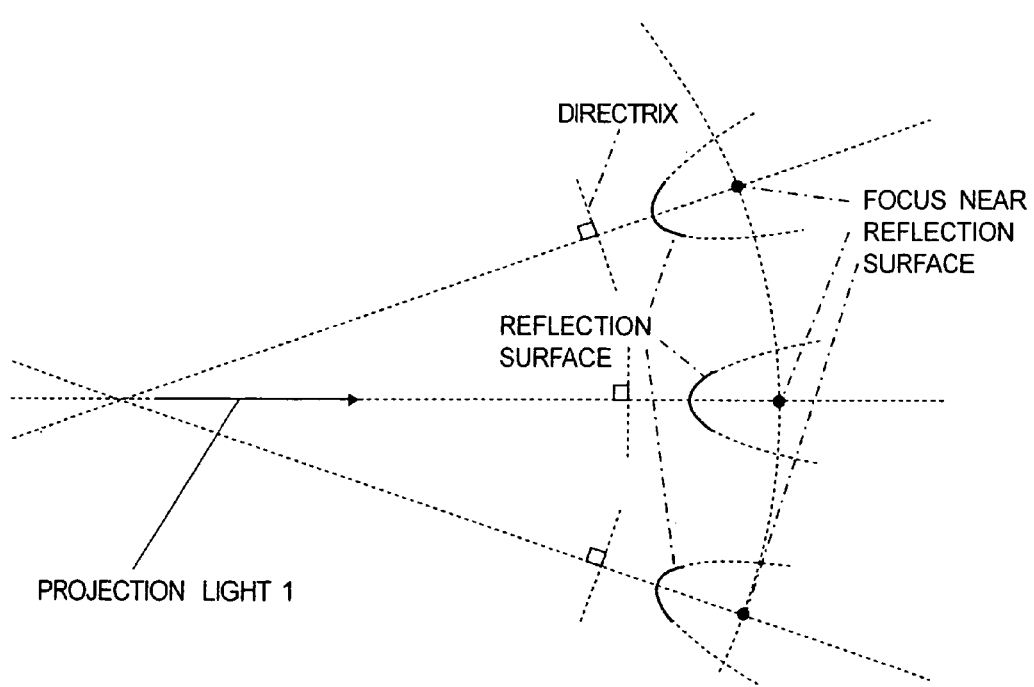
FIG. 23 is a schematic diagram of a third modification of the projection type screen according to the second embodiment.

Furthermore, in case that a shape of each reflection surface is an elliptic shape convex to the incident direction of projection light, as shown in FIG. 23, the reflection surface array can be formed so that each straight line perpendicular to a directrix of an ellipse of each reflection surface and passing through a focus point of the ellipse crosses at the same point in front of the screen and the focus of each ellipse exists on a circle centered at the same point. In this case, the reflection surface array has the same shape of reflection surface for the center and the edge of a screen. Furthermore, a position of an exit pupil of a projection lens is located at a cross point of straight lines each perpendicular to a directrix of an ellipse and passing through a focus point of the ellipse. Accordingly, a distance from the position of the exit pupil of the projection lens to each reflection surface coincides, and the positional relationship between the exit pupil and the focus of each reflection surface can be fixed.

The Third Embodiment

In the third embodiment, an element for selecting between transmission and scattering states is located between the reflection surface array and the lenticular sheet. By switching state of the element, display of stereoscopic image and display of usual display can be selected in the projection type screen.

Figure 24A:
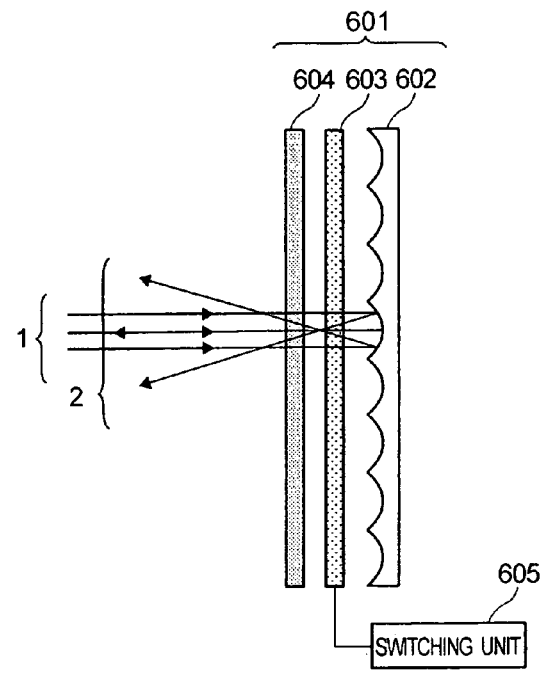
FIGS. 24A and 24B show components of a projection type screen according to a third embodiment of the present invention.
Figure 24B:
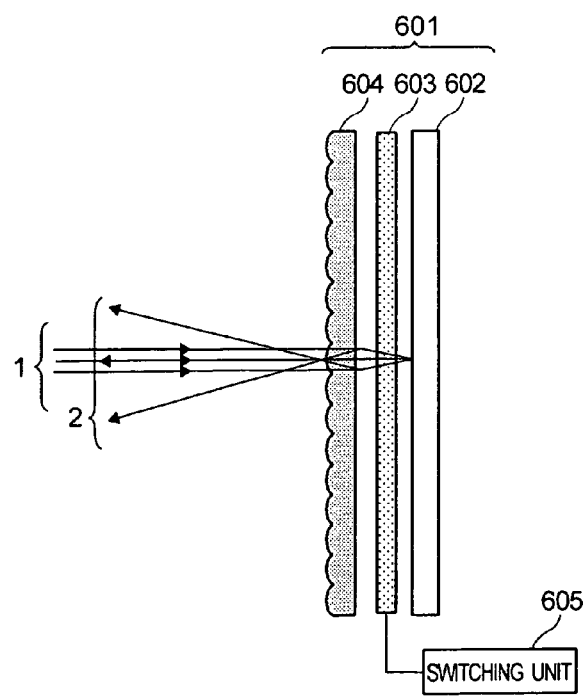

FIGS. 24 A and B are respectively sections of the projection type screen 601 along a horizontal direction and a vertical direction according to the third embodiment. As shown in FIGS. 24 A and B, the projection type screen 601 has a reflection array 602, an element 603 for selecting transmission and scattering states, a lenticular sheet 604, and a switching unit 605. In the reflection surface array 602, a plurality of reflection surfaces having a mirror reflectivity each of which section along a horizontal direction is a parabolic shape are arranged along the horizontal direction. The element 603 for selecting transmission and scattering states is located at an incident side of a projection light for the reflection array 602. The lenticular sheet 604 having diffusivity along a vertical direction is located at the incident side of the projection light for the element 603. The switching unit 605 switches between transmission and scattering states of the element 603 by applying a voltage to the element 603.

In comparison with the first embodiment, the element 603, of which transmission and scattering states are switched, is located between the reflection surface array 602 and the lenticular sheet 604. The reflection surface array 602 and the lenticular sheet 604 are the same as in the first embodiment.

By applying a voltage from the switching unit 605, the element 603 can switch between transmission and scattering states. In case of displaying a stereoscopic image by a projection light 1 from the projector, the switching unit 605 applies a voltage to the element 603, and the element 603 is under a transmission state. In this case, an incident light to the element 603 is incident to the reflection surface array 602 without scattering. Accordingly, in the same way as in the first embodiment, each division image included in the incident light 1 is reflected along a respective predetermined direction by the reflection surface array 602, and the observer can view a stereoscopic image.

Figure 25:
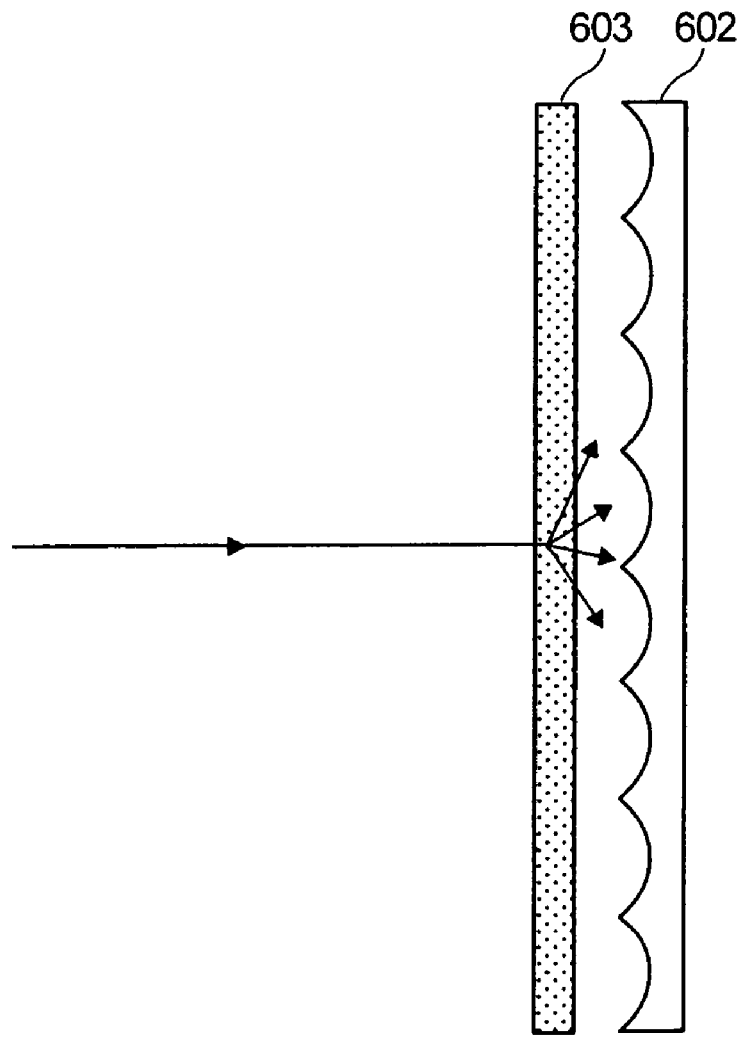
FIG. 25 is a schematic diagram showing a function of elements of selecting transmission and scattering state according to the third embodiment.

On the other hand, in case of displaying a usual image, the switching unit 605 does not apply a voltage to the element 603. In this case, the element 603 is under a scattering state. Accordingly, as shown in FIG. 25, when a projection light 1 transmits through the element 603, the projection light 1 is scattered along arbitrary directions. Briefly, mirror reflectivity of the reflection surface array 602 is concealed, and reflection of projection light 1 by the projection type screen 601 is set as scattering reflection.

By selecting transmission state and scattering state in the element 603 using the switching unit 605, for example, in case of projecting a usual two-dimensional image from a projector, the element 603 is set as scattering state, and the projection type screen 601 functions as a usual screen. In case of displaying a stereoscopic image, the element 603 is set as transmission state by the switching unit 605, and the projection type screen 601 functions in order for the observer to view a stereoscopic image.

As the element 603 of selecting transmission and scattering state, by mixing a monomer with a liquid crystal molecule and sealing into a cell, a liquid crystal element polymerized by UV irradiation can be used. For example, Polymer Dispersed Liquid Crystal (PDLC) elements or Polymer Networked Liquid Crystal (PNLC) elements can be used.

Furthermore, by applying a voltage to only a part of the element 603 using the switching unit 605, a part of the element 603 can be set as transmission state and another part of the element 605 can be set as scattering state. In this case, an image including both a usual two-dimensional image and a stereoscopic image can be observed on the projection type screen 601. In order to apply voltage to only a part of the element 603, for example, a transparent electrode is divided, connected with the element 603, and driven by segment.

In this way, in the projection type screen of the third embodiment, the element for selecting between transmission and scattering states is located between the reflection surface array and the lenticular sheet. Accordingly, based on a projection image from the projector, a stereoscopic image and a usual two-dimensional image can be selectively observed.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A projection type screen, comprising:
   a reflection surface array including a plurality of reflection surfaces along a horizontal direction, each reflection surface having a quadratic curve shape along the horizontal direction; and
   a lenticular sheet at an incident side of a projection light for the reflection surface array, the lenticular sheet having diffusivity along a vertical direction.

2. The projection type screen according to claim 1, wherein
   the quadratic curve shape is a parabolic shape concave toward an incident direction of the projection light,
   a directrix of a parabola of each reflection surface coincides, and
   a focus point of the parabola of each reflection surface exists on the same straight line parallel to the directrix.

3. The projection type screen according to claim 1, wherein
   the quadratic curve shape is a parabolic shape concave toward an incident direction of the projection light,
   a straight line perpendicular to a directrix of a parabola of each reflection surface and passing through a focus point of the parabola of each reflection surface crosses at the same point, and
   each focus point exists on the same straight line.

4. The projection type screen according to claim 1, wherein
   the quadratic curve shape is a parabolic shape concave toward an incident direction of the projection light,
   a straight line perpendicular to a directrix of a parabola of each reflection surface and passing through a focus point of the parabola of each reflection surface crosses at the same point, and
   each focus point exists on a circle centered at the same point.

5. The projection type screen according to claim 1, wherein
   the quadratic curve shape is a parabolic shape convex toward an incident direction of the projection light,
   a straight line perpendicular to a directrix of a parabola of each reflection surface and passing through a focus point of the parabola of each reflection surface crosses at the same point, and
   each focus point exists on the same straight line.

6. The projection type screen according to claim 1, wherein
   the quadratic curve shape is a parabolic shape convex toward an incident direction of the projection light,
   a straight line perpendicular to a directrix of a parabola of each reflection surface and passing through a focus point of the parabola of each reflection surface crosses at the same point, and
   each focus point exists on a circle centered at the same point.

7. The projection type screen according to claim 1, wherein
   the quadratic curve shape is an elliptic shape concave toward an incident direction of the projection light,
   a straight line perpendicular to a directrix of an ellipse of each reflection surface and passing through a focus point of the ellipse of each reflection surface coincidentally crosses at another focus point more distant from the ellipse than the focus point, and
   the focus point of each reflection surface exists on the same straight line.

8. The projection type screen according to claim 1, wherein
   the quadratic curve shape is an elliptic shape concave toward an incident direction of the projection light,
   a straight line perpendicular to a directrix of an ellipse of each reflection surface and passing through a focus point of the ellipse of each reflection surface coincidentally crosses at another focus point more distant from the ellipse than the focus point, and
   the focus point of each reflection surface exists on a circle centered at another focus point.

9. The projection type screen according to claim 1, wherein
   the quadratic curve shape is an elliptic shape convex toward an incident direction of the projection light,
   a straight line perpendicular to a directrix of an ellipse of each reflection surface and passing through a focus point of the ellipse of each reflection surface crosses at the same point, and
   each focus point exists on the same straight line.

10. The projection type screen according to claim 1, wherein
    the quadratic curve shape is an elliptic shape convex toward an incident direction of the projection light,
    a straight line perpendicular to a directrix of an ellipse of each reflection surface and passing through a focus point of the ellipse of each reflection surface crosses at the same point, and
    each focus point exists on a circle centered at the same point.

11. An image projection system, comprising:
    a light emitting apparatus emitting a projection light including a display image; and
    a projection type screen on which the projection light is incident;
    said projection type screen comprising
    a reflection surface array including a plurality of reflection surfaces along a horizontal direction, each reflection surface having a quadratic curve shape along the horizontal direction; and a lenticular sheet an incident side of a projection light for the reflection surface array, the lenticular sheet having diffusivity along a vertical direction.

12. The projection type screen according to claim 11, wherein
the quadratic curve shape is a parabolic shape concave toward an incident direction of the projection light,
a directrix of a parabola of each reflection surface coincides, and
a focus point of the parabola of each reflection surface exists on the same straight line parallel to the directrix.

13. The projection type screen according to claim 11, wherein
the quadratic curve shape is a parabolic shape concave toward an incident direction of the projection light,
a straight line perpendicular to a directrix of a parabola of each reflection surface and passing through a focus point of the parabola of each reflection surface crosses at the same point, and
each focus point exists on the same straight line.

14. The projection type screen according to claim 11, wherein
the quadratic curve shape is a parabolic shape concave toward an incident direction of the projection light,
a straight line perpendicular to a directrix of a parabola of each reflection surface and passing through a focus point of the parabola of each reflection surface crosses at the same point, and
each focus point exists on a circle centered at the same point.

15. The projection type screen according to claim 11, wherein
the quadratic curve shape is a parabolic shape convex toward an incident direction of the projection light,
a straight line perpendicular to a directrix of a parabola of each reflection surface and passing through a focus point of the parabola of each reflection surface crosses at the same point, and
each focus point exists on the same straight line.

16. The projection type screen according to claim 11, wherein
the quadratic curve shape is a parabolic shape convex toward an incident direction of the projection light,
a straight line perpendicular to a directrix of a parabola of each reflection surface and passing through a focus point of the parabola of each reflection surface crosses at the same point, and
each focus point exists on a circle centered at the same point.

17. The projection type screen according to claim 11, wherein
the quadratic curve shape is an elliptic shape concave toward an incident direction of the projection light,
a straight line perpendicular to a directrix of an ellipse of each reflection surface and passing through a focus point of the ellipse of each reflection surface coincidentally crosses at another focus point more distant from the ellipse than the focus point, and
the focus point of each reflection surface exists on the same straight line.

18. The projection type screen according to claim 11, wherein
the quadratic curve shape is an elliptic shape concave toward an incident direction of the projection light,
a straight line perpendicular to a directrix of an ellipse of each reflection surface and passing through a focus point of the ellipse of each reflection surface coincidentally crosses at another focus point more distant from the ellipse than the focus point, and
the focus point of each reflection surface exists on the same circle centered at another focus point.

19. The projection type screen according to claim 11, wherein
the quadratic curve shape is an elliptic shape convex toward an incident direction of the projection light,
a straight line perpendicular to a directrix of an ellipse of each reflection surface and passing through a focus point of the ellipse of each reflection surface crosses at the same point, and
each focus point exists on the same straight line.

20. The projection type screen according to claim 11, wherein
the quadratic curve shape is an elliptic shape convex toward an incident direction of the projection light,
a straight line perpendicular to a directrix of an ellipse of each reflection surface and passing through a focus point of the ellipse of each reflection surface crosses at the same point, and
each focus point exists on the same circle centered at the same point.

* * * * *